US006762695B1

(12) United States Patent
Eslambolchi et al.

(10) Patent No.: US 6,762,695 B1
(45) Date of Patent: Jul. 13, 2004

(54) RADIO TOWER LIGHTING SYSTEM

(75) Inventors: Hossein Eslambolchi, Los Altos Hills, CA (US); John Sinclair Huffman, Conyers, GA (US); Bradley Tihinen, Acworth, GA (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 10/217,868

(22) Filed: Aug. 13, 2002

(51) Int. Cl.[7] ............................ B64D 47/00; G08G 5/00

(52) U.S. Cl. ........................ 340/983; 340/981; 340/953

(58) Field of Search .............................. 340/983, 854.7, 340/870.28, 870.29, 952, 953, 954, 955, 956, 981, 982, 555, 556, 815.42, 815.43; 359/151; 250/227.11

(56) References Cited

U.S. PATENT DOCUMENTS 4,092,707 A 5/1978 Millerbernd
4,115,845 A 9/1978 Blahut
4,270,161 A 5/1981 Perretta
4,272,802 A 6/1981 Steadman
4,420,740 A * 12/1983 Brown et al. ............... 340/983
4,717,991 A * 1/1988 Murphree, Jr. ............... 362/35
5,031,085 A 7/1991 Rustin
5,155,666 A 10/1992 Radford et al.
5,816,678 A 10/1998 Woehler
5,980,069 A 11/1999 Guerrero
6,131,349 A 10/2000 Hill
6,173,537 B1 1/2001 Davidsson et al.
6,525,668 B1 * 2/2003 Petrick .................. 340/815.45

* cited by examiner

*Primary Examiner*—John Tweel

(57) ABSTRACT

A radio tower light system utilizes a ground-level semiconductor optical light source and includes fiber optic cabling that is strung along the tower to the various desired locations for the beacon light. A lens system, at each beacon site, is coupled to the termination of a fiber optic cable and used to magnify and radiate the optical signal in the desired direction. The use of a ground-based light source eliminates the need for a technician to climb the tower (or lower the beacon) upon failure of the light source.

9 Claims, 2 Drawing Sheets

RADIO TOWER LIGHTING SYSTEM

TECHNICAL FIELD

The present invention relates to a radio tower lighting system and, more particularly, to the use of a ground-based light source and fiber optic cabling to provide beacon light on a radio tower.

BACKGROUND OF THE INVENTION

Beacon lights are required on structures above a certain height in localities where aircraft are present. These requirements are usually covered by federal regulation and require at least one beacon on top of a structure and often a plurality of beacons at designated heights. Particularly affected by this requirement are towers such as may be used by power utilities and radio towers used by communication companies.

Repair or replacement of such tower beacon lights has presented the problem of danger to service personnel in climbing to and from such elevated locations, such dangers being increased during inclement weather—if not rendering servicing impossible during such conditions. Efforts to alleviate these problems include techniques such as the provision of unitized replacement fixtures at pole ends, or cable and link mechanisms for lowering the damaged fixtures. However, the expense and time associated with these techniques has been found to be overwhelming, considering the number of towers that need to be maintained. Moreover, most federal laws require the lights to be repaired within a limited period of time. Costly fines—accruing on a daily basis—can be assessed against an owner should the light remain dark beyond the time limit defined by law.

Thus, a need remains in the art for a tower light system that can be easily maintained without incurring the expenses associated with utilizing additional equipment to raise and lower the light fixtures or having technicians available to climb the towers as needed.

SUMMARY OF THE INVENTION

The need remaining in the prior art is addressed by the present invention, which relates to a radio tower lighting system and, more particularly, to the use of a ground-based light source and fiber optic cabling to provide beacon light on a radio tower.

In accordance with the present invention, a light source such as an LED or laser is located in a ground-level equipment shelter associated with the tower. One or more fiber optic cables are coupled to the light source and installed to run along the tower structure to terminate at the various beacon locations along the sides and top of the tower. At the termination sites, each fiber is coupled to a lens designed to magnify and disburse the light in a 360° pattern so that it is clearly visible in all directions. Since all of the active optics are located at ground level, a technician merely needs to replace the LED or laser in the equipment at the shelter upon failure of a light source.

In a preferred embodiment, the various lenses are color-coded, depending upon the particular function associated with each beacon (i.e., “red” for side lights and beacons, “clear” for strobes). Since fiber optic cable is non-metallic, the cable will not carry stray currents or lightning strikes into the shelter.

Other and further embodiments and advantages of the present invention will become apparent during the course of the following discussion and by reference to the accompanying drawings.

DETAILED DESCRIPTION

Figure 1:
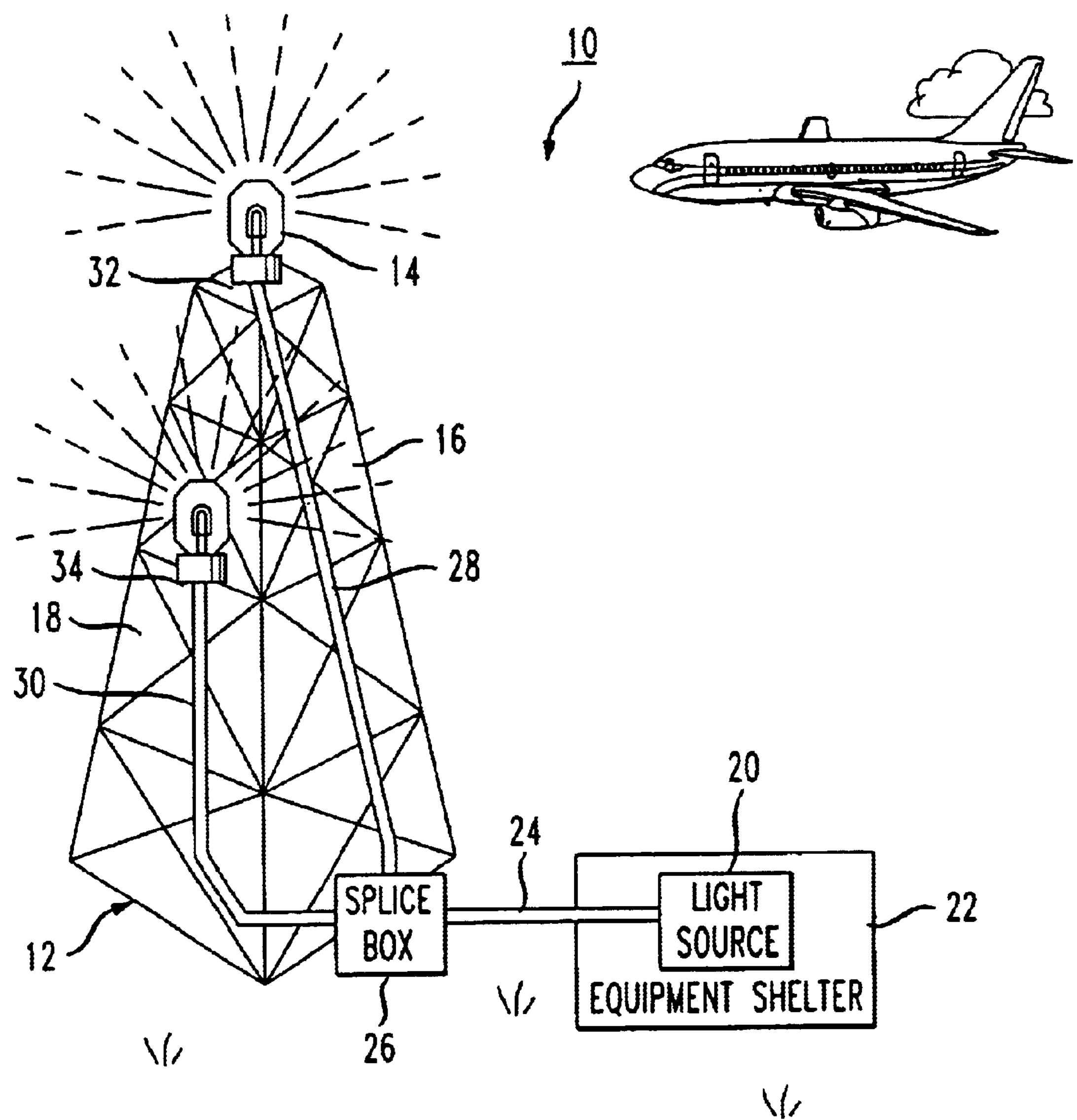
FIG. 1 illustrates, in basic block diagram form, an exemplary tower arrangement for implementing the light system of the present invention.

FIG. 1 illustrates an exemplary tower arrangement 10 that may utilize the ground-level lighting system of the present invention. As discussed above, various types of power and communication towers require lighting systems so that the tower location (as well as the height of the tower) is clearly visible to aircraft in the area. In this simplified drawing, an exemplary tower 12 is illustrated as including a top beacon light 14. It is to be understood that tower 12 may also require a series of side lights to be disposed along members 16 and 18 of tower 12. In the prior art, an expensive, heavy and cumbersome lighting system was required to be hoisted or otherwise lifted to the top of tower 12 upon initial installation. Thereafter, when the need arose to repair or replace the light source, a technician had to climb the tower, carrying the replacement parts with him.

As an improvement over this process, the ground level light system of the present invention includes a light source 20 located within a ground-level equipment shelter 22. Light source 20 comprises a semiconductor optical transmitting device, such as a laser or LED, of sufficient power to propagate a light signal from ground level to at least the top of tower 12. As shown, a fiber optic input cable 24 is coupled to light source 20 and is used to bring the light signal from equipment shelter 22 to tower 12. In the particular exemplary embodiment shown in FIG. 1, a fiber splice box 26 is included and used to couple a pair of fiber cables 28 and 30 to fiber optic input cable 24. Fiber cable 28 is illustrated as attached to member 16 of tower 12, reaching to top portion 32 of tower 12. Fiber cable 30 is illustrated as attached to member 18, disposed to reach a height 34 suitable to support a “side light” on tower 12.

As will be described below in association with FIG. 2, each cable terminates at and is coupled to a lens system sufficient to create a light beam of a predetermined magnification power over the entire 360° arc. Referring to FIG. 1, fiber cable 28 terminates in a first lens system 36 at the top of tower 12 and fiber cable 30 terminates in a second lens system 38 at side location 34 of tower 12. Each fiber cable 24, 28 and 30 is preferably coated with a black polyethylene material to resist sun damage, and is formed to include strength members (of a material such as Kevlar) within the cable itself.

The utilization of the combination of the ground-level light source and fiber optic cables thus eliminates the need for technicians to climb a tower to repair or replace a light fixture or, alternatively, for some sort of pulley and rope mechanism to be used to lower a defective light to an easier working elevation. If an LED or laser source 20 fails, a technician merely needs to replace the failed semiconductor optical device within equipment shelter 22.

Figure 2:
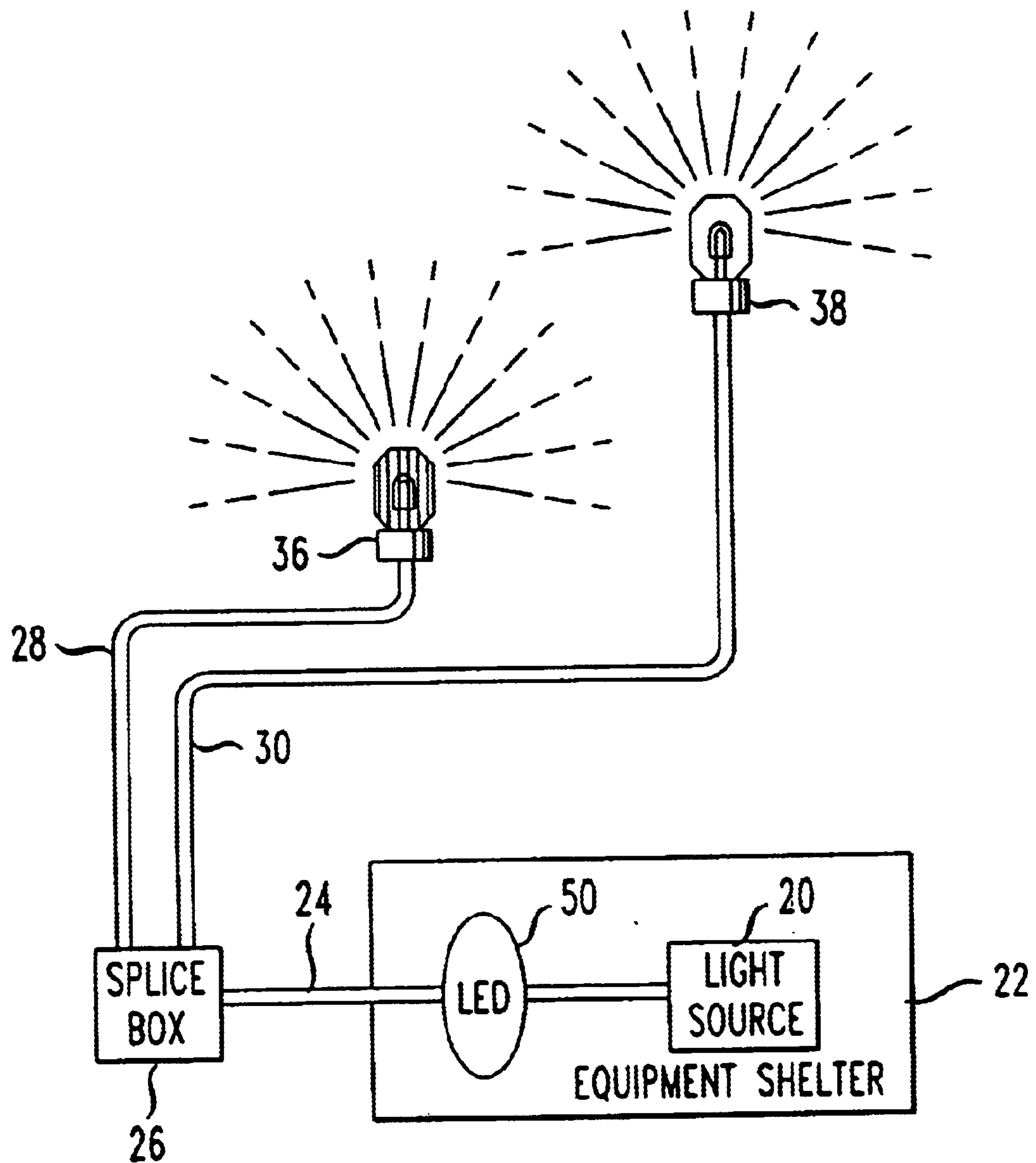
FIG. 2 contains a diagram of a particular light system for use with a radio tower in accordance with the teachings of the present invention.

FIG. 2 illustrates, in slightly more detail, an exemplary ground-level light source system that may be used with a tower in accordance with the teachings of the present invention. In this case, ground-level light source 20 includes an LED light emitter 50 that is powered in a conventional, well-known fashion (not shown) to emit an optical signal at a predetermined power level. It is to be understood that a laser transmitter, or any other suitable semiconductor optical device, can be used as the light source in the arrangement of the present invention. The optical signal output from LED 50 is then coupled into fiber optic input cable 24 and applied as an input to splice box 26, which in this case comprises a 1×2 optical coupler. In its most general form, the splice box may include a 1×N optical coupler for splitting the signal optical input signal into a plurality of N separate optical signals that are then coupled into a plurality of N optical fibers disposed upward along tower 12. Referring back to FIG. 2, splice box 26 as shown functions to split the light signal propagating along cable 24 into a pair of signals of equal power, coupling the first signal into fiber cable 28 and the second signal into fiber cable 30. Lens systems 36 and 38 comprise conventional lensing used for tower applications, such as Fresnel lenses that allow for the associated beam to be magnified and disbursed in the 360° pattern so that it is visible in all directions. Each lens system may also be tinted the particular color associated with the different types of lights (for example, "red" for side lights and beacons, "clear" for strobes).

Advantageously, the fiber optic cables are non-metallic so as not to carry lightning strikes into the ground-level equipment shelter. Moreover, well-known "sparing" arrangements, such as used in undersea cable fiber installations may be utilized in the ground-level light source to automatically recognize a "failed" light transmitting device and switch into service a "spare device".

Additional advantages and modifications to the preferred embodiments of the present invention as described above will readily occur to those skilled in the art. Therefore, the invention in its broader aspects is not limited to the specific details, representative devices, and illustrative examples as shown and described. Accordingly, departures may be made from such details without departing from the spirit or scope of the general inventive concept as defined by the claims appended hereto.

What is claimed is:

1. A beacon lighting system for use on a tower structure, the system comprising a ground-level semiconductor optical light source for generating an optical output signal;

at least one optical fiber coupled at a first end to said semiconductor optical light source, said at least one optical fiber disposed upward along a tower structure with a second, opposing end terminating at a predetermined beacon light location such that the optical output signal from said semiconductor optical light source propagates along said at least one optical fiber; and a lens system coupled to said second end of said at least one optical fiber for magnifying said propagating optical output signal and radiating said signal in a predetermined pattern.

2. A beacon light system as defined in claim 1 wherein the semiconductor optical light source comprises an LED-based transmitter.

3. A beacon light system as defined in claim 1 wherein the semiconductor optical light source comprises a laser-based transmitter.

4. A beacon light system as defined in claim 1 wherein the system comprises a plurality of fiber optic cables, each cable terminating at a different beacon light location on an associated tower.

5. A beacon light system as defined in claim 1 wherein the semiconductor optical light source is housed in a ground-level equipment shelter associated with a tower.

6. A beacon light system as defined in claim 1 wherein the at least one fiber optic cable includes a black polyethylene outer coating.

7. A beacon light system as defined in claim 1 wherein each lens system includes a Fresnel lens.

8. A beacon light system as defined in claim 7 wherein the optical output signal is radiated in a 360° pattern.

9. A beacon light system as defined in claim 1 wherein each lens system is tinted to a predetermined color associated with the type of light being transmitter.

* * * * *